US000001865H

United States Statutory Invention Registration [19]

[11] Reg. Number: H1,865

Aoki

[45] Published: Oct. 3, 2000

[54] LURE

[76] Inventor: Shizuo Aoki, 264-2, Ishgami, Itonuki-cho, Motosu-gun, Gifu-ken, Japan

[21] Appl. No.: 08/877,587

[22] Filed: Jun. 17, 1997

[51] Int. Cl.[7] ..... A01K 85/00; A01K 85/10

[52] U.S. Cl. ..... 43/42.13; 43/42.19

[58] Field of Search ..... 43/42.16, 422.19, 43/42.13, 42.14

[56] References Cited

U.S. PATENT DOCUMENTS

| | | | |
|---|---|---|---|
| 3,987,576 | 10/1976 | Strader | 43/42.16 |
| 4,208,824 | 6/1980 | Maxwell | 43/42.19 |
| 4,209,932 | 7/1980 | Pate | 43/42.13 |
| 4,571,877 | 2/1986 | Montgomery | 43/422.13 |
| 4,625,448 | 12/1986 | Borders | 43/42.13 |
| 4,640,041 | 2/1987 | Stanley | 43/42.13 |
| 4,718,191 | 1/1988 | Gentry | 43/42.13 |
| 4,730,410 | 3/1988 | Sobieniak | 43/42.19 |
| 4,742,639 | 5/1988 | Gunn | 43/42.13 |
| 4,765,085 | 8/1988 | Wotawa et al. | 43/42.13 |
| 4,815,233 | 3/1989 | Pingel | 43/42.13 |
| 4,901,470 | 2/1990 | Gentry | 43/42.13 |
| 4,998,371 | 3/1991 | Driesel | 43/42.16 |
| 5,022,177 | 6/1991 | Gibson | 43/42.13 |
| 5,050,334 | 9/1991 | Standish, Jr. | 43/42.13 |
| 5,092,941 | 3/1992 | Miura | 148/563 |
| 5,133,147 | 7/1992 | Benard | 43/42.13 |
| 5,146,706 | 9/1992 | Hilliard | 43/42.13 |
| 5,203,103 | 4/1993 | Hawley | 43/42.24 |
| 5,226,268 | 7/1993 | Sisson, Jr. | 43/42.13 |
| 5,358,796 | 10/1994 | Nakamura et al. | 428/660 |
| 5,412,901 | 5/1995 | Matinez | 43/42.19 |
| 5,491,926 | 2/1996 | Mostovsky | 43/42.19 |
| 5,564,218 | 10/1996 | Kato | 43/42.13 |
| 5,605,004 | 2/1997 | Boullt et al. | 43/42.13 |
| 5,711,105 | 1/1998 | Schreifels et al. | 43/44.98 |

FOREIGN PATENT DOCUMENTS

WO 98/24309 6/1998 WIPO .

OTHER PUBLICATIONS

In–Fisherman The Journal of Freshwater Fishing, Feb. (vol. 24 No. 1) 1999, "Today's Truly Super Spinnerbaits Superb new Baits on The Bass Scene", by Steve Quinn, pp. 58–65, Feb. 1999.

*Primary Examiner*—Michael J. Carone
*Assistant Examiner*—Darren Ark
*Attorney, Agent, or Firm*—Dennison, Meserole, Scheiner & Schultz

[57] ABSTRACT

A lure including a connector member to be attached to a fishing line, and a fish-luring member provided on the connector member. The connector member has a portion made of a shape memory alloy which may exhibit super-elasticity.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LURE

CROSS REFERENCE

This U.S. patent application is identical to Japanese application serial number 7-139921, which was filed in Japan on Jun. 10, 1995, and was published on Nov. 26, 1996.

BACKGROUND OF THE INVENTION

1. Field of the Invention

The present invention relates to a fishing gear, and more particularly to an artificial bait or lure which may uniquely behave for effectively luring fishes.

2. Description of the Prior Art

A lure fishing has become popular as a sport fishing. As is well known, the lure fishing is a fishing in which a lure is suitably operated for luring fishes. The lure used in the lure fishing is manufactured in various types or patterns so that fishermen may choose the best one for the objective fishes or fishing conditions.

Some of the lures have a fish-luring member which exhibits complicated behavior to lure fishes. The fish-luring member will be, for example, a metal blade. The lure having the metal blade is known as a "spinner type" or a "splatter type". The latter is a combination of one or more different types of lures, for example, a combination of the spinner type lure and a dancing member known as a "hula skirt".

Conventionally, the lure includes a desirably shaped connector or shaft on which the fish-luring member and a fishhook are mounted.

Fishes tend to flock together to a fish-gathering place, that is, a place having a special configuration of the ground under the water or a place which is rich in obstructions such as aquatic plants, rocks and submerged woods. Generally speaking, such a fish-gathering place may be a good fishing spot. However, in such a place, the lure may be easily caught in such obstructions.

When the lure is caught in the obstructions, if a fishing line to which the lure is connected is pulled in an inadequate direction or applied with excessive force in order to remove the lure from the obstructions, the shaft of the lure may deform in shape, thereby blocking or disturbing smooth action of the fish-luring member mounted on the shaft. Therefore, the shaft as deformed has to be restored to its original shape before the lure is used again.

However, it is very difficult to restore the shaft as deformed. This is because the conventional shaft of the lure is made of a metal wire. As will be easily understood, unless the shaft is completely restored, the fish-luring member can not smoothly move on the shaft in use. Thus, the lure of which the shaft is not completely restored may lose fish-luring capability. This may reduce inherent functions of the lure.

SUMMARY OF THE INVENTION

It is an object of the present invention to provide a lure in which the problems associated with the conventional lure can be eliminated, that is, a lure having a connector member which is made of deformation resistant material or self-restorable material.

The present invention provides a lure including a connector member to be attached to a fishing line, and a fish-luring member provided on the connector member. The connector member has a portion made of a shape memory alloy which may exhibit superelasticity.

With the lure of the present invention, the connector member may exhibit improved resistance to deformation. Further, the connector member, even if unexpectedly bent, is immediately restored to its original shape. Therefore, the fish-luring member may always smoothly move on the connector member, thereby preventing the lure from loosing its function.

The shape memory alloy may be an alloy which exhibits the superelasticity at a specific temperature range reflecting temperatures of water in which the lure is used.

With the lure thus constructed, the connector member may exhibit improved resistance to deformation in the water. Further, the connector member, even if bent in the water, is immediately restored to its original shape. Thus, the connector member is not kept in the deformed condition provided that the water is in the specific temperature range.

The present invention will become more fully apparent from the claims and the description as it proceeds in connection with the drawings.

DETAILED DESCRIPTION OF THE PREFERRED EMBODIMENT

Preferred embodiments of the present invention will be described in detail with reference to the drawings. It should be noted, however, that the present invention is not limited to the following embodiments.

A first embodiment of the present invention will now be described with reference to FIGS. 1 and 2.

Figure 1:
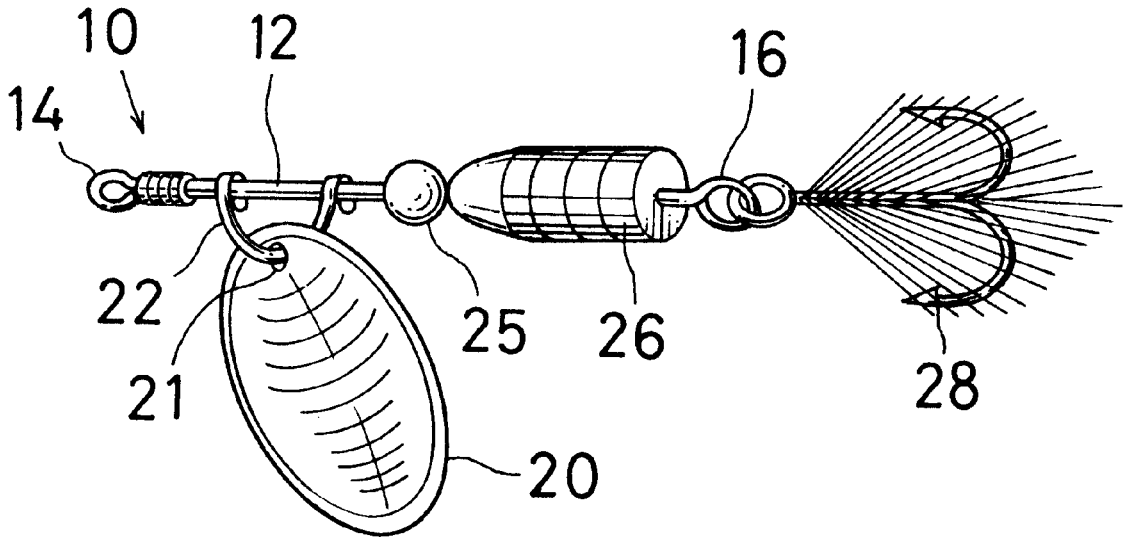
FIG. 1 is a perspective view of a lure according to a first embodiment of the present invention.
Figure 2:
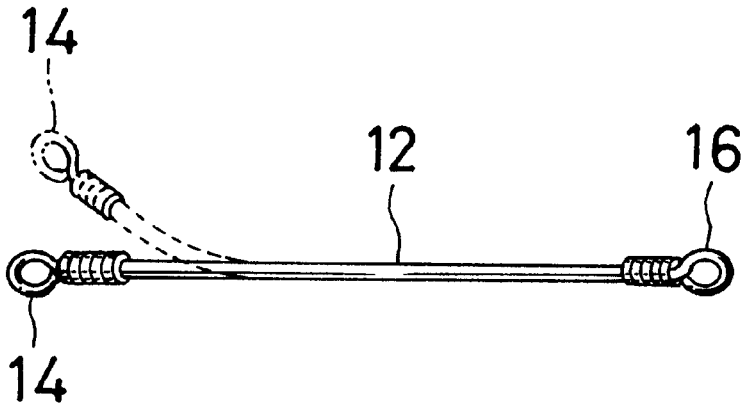
FIG. 2 is a perspective view of a connector of the lure.

As shown in FIGS. 1 and 2, a lure 10 is of a spinner type and is mainly constituted of a shaft 12 as a connector member, a blade 20 as a fish-luring member, a bullet-shaped body 26 and an anchor-shaped fishhook 28. The shaft 12 is formed at one end with an eye 14 as a fishing line engagement portion through which a fishing line (not shown) is to be inserted. The shaft 12 is also formed at the other end with an eye 16 as a fishhook engagement portion on which the fishhook 28 is carried. The blade 20 is movably mounted on the shaft 12 by a U-link or clevis 22 and is positioned adjacent to the eye 14. The body 26 is mounted on the shaft 12 and is positioned adjacent to the eye 16. The body 26 is made of desired density material so as to act as a sinker or weight to prevent rising of the lure 10. Preferably, the body 26 is formed to imitate a bait. Further, the shaft 12 is provided with a ball 25 positioned between the blade 20 and the body 26. The ball 25 is slidably mounted on the shaft 12 so as to act as a smoother for smoothly moving the blade 20.

The shaft 12 is made of a wire of a shape memory alloy which exhibits superelasticity and shape recovery capability at a specific temperature range reflecting temperatures of water in which the lure 10 is used. Thus, the shaft 12 has improved resistance to deformation in the water. Further, the shaft 12, even if bent or deformed in the water as shown in phantom lines in FIG. 2, is immediately restored to its original shape. Moreover, the shape memory alloy is less subject to deterioration with time and has higher corrosion resistance (higher resistance to rusting). Therefore, the shaft 12 cannot be easily rusted if the water is the seawater. This may extend the working life of the lure 10.

In addition, the shaft 12 may be a hybrid shaft made of the shape memory alloy and a conventional metal. As will be appreciated, in such a hybrid shaft, the shape memory alloy should be used in a portion to which bending force is possibly applied in use, for example, a portion adjacent to the eye 14.

Referring to FIG. 1 again, the blade 20 is a leaf-shaped or oval-shaped plate and has a curved mid surface which is preferably treated to effectively reflect light. The blade 20 is formed with an aperture 21 through which the clevis 22 is to be inserted. Although in this embodiment, the blade 20 is mounted on the shaft 12 by the clevis 22, the blade 20 can be directly mounted on the shaft 12. The blade 20 thus constructed may rotate around the shaft 12 when the lure 10 is pulled (or leftwardly moved in FIG. 1) in the water. This is because the resistance of the water acts on the curved surface of the blade 20. Additionally, the curved surface of the blade 20 may glitteringly reflect light to lure fishes.

As described above, the body 26 may act as a weight to prevent rising of the lure 10 and is formed to imitate a bait for increasing fish-luring capability. However, the body 26 may be modified such that a real bait can be put thereon. Also, the body 26 may have various shapes other than the bullet shape. Further, the body 26 may be modified and rotatably mounted on the shaft 12 in order to act as an additional fish-luring member.

Although the anchor-shaped fishhook 28 carried on the eye 16 is constituted of a plurality of hook elements, at least one of the hook elements may be formed to imitate a worm.

The operation of the lure 10 thus constructed will now be described.

The lure 10 is operated in the same manner as a conventional lure. If the fishing line is pulled when the lure 10 is caught in obstructions such as aquatic plants and rocks, the shaft 12 is bent in the direction in which the fishing line is pulled, for example, in the direction as shown in phantom lines in FIG. 2. As will be recognized, the shaft 12 is bent at a section on which the blade 20 is mounted rather than a section which is covered by the body 26.

However, when the lure 10 is removed from the obstructions, the shaft 12 is immediately and completely restored to the original shape (linear shape in the drawing) because of its elasticity. Thus, the blade 20 may smoothly move on the shaft 12 as before, thereby preventing the lure 10 from loosing its function. Therefore, the lure 10 can be instantly used again without any additional work after it is removed from the obstructions.

As described hereinbefore, the shaft 12 may exhibit superelasticity and shape recovery capability at the specific temperature range. Thus, the shaft 12 exhibits resistance to deformation and, if bent, is immediately restored to the original shape. Therefore, the shaft 12 does not remain in the deformed condition provided that the water is in the specific temperature range.

Additionally, when the fishing line is operated such that the lure 10 is pulled at constant speed in the water, the shaft 12 gently flexes so that the lure 10 suitably behaves to lure fishes.

A second embodiment of the present invention will now be described with reference to FIGS. 3 and 4.

Figure 3:
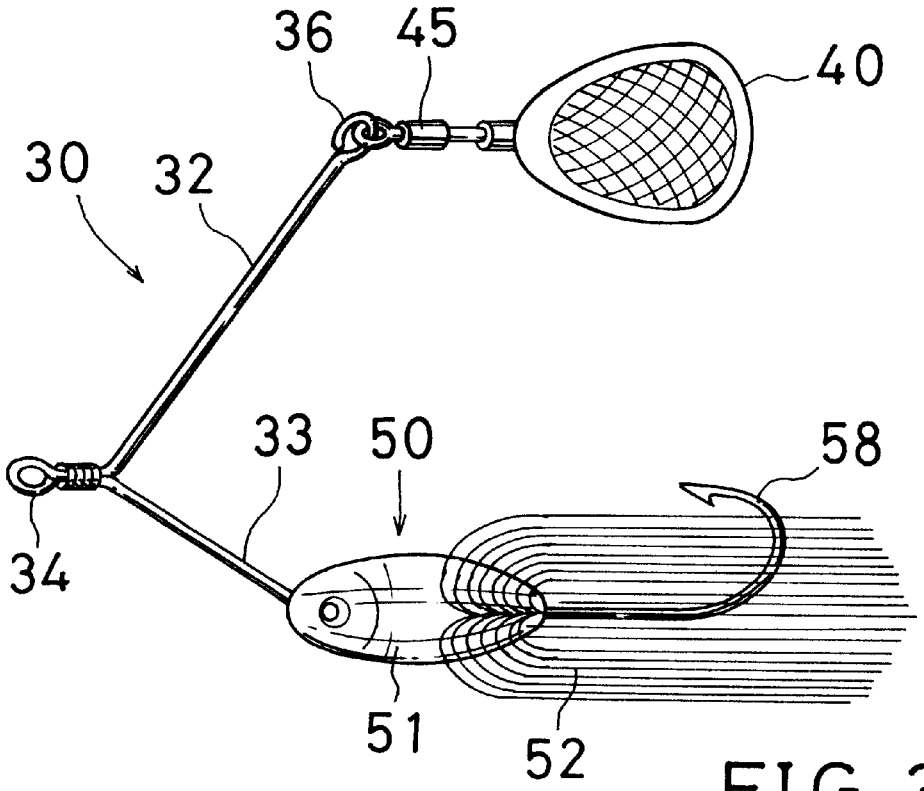
FIG. 3 is a perspective view of a lure according to a second embodiment of the present invention.
Figure 4:
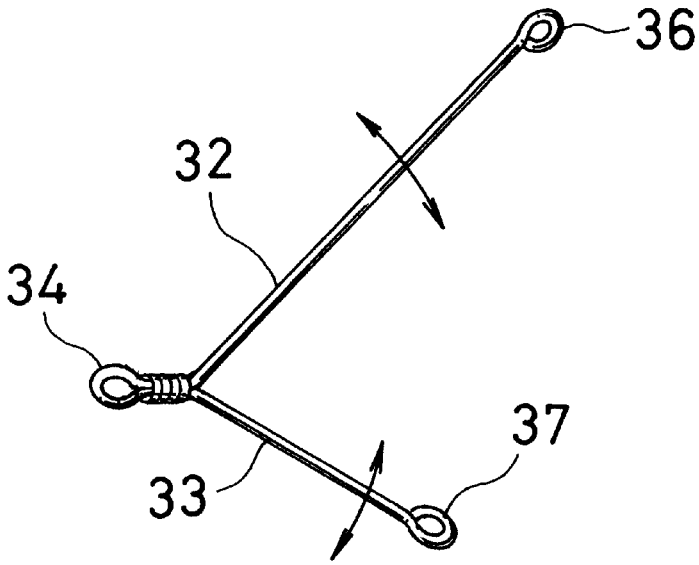
FIG. 4 is a perspective view of a connector of the lure.

As shown in FIGS. 3 and 4, a lure 30 is of a splatter type lure and is mainly constituted of shafts 32 and 33 as a connector member, a blade 40 as a fish-luring member, a skirt 50 and a fishhook 58. As best shown in FIG. 4, the shafts 32 and 33 are combined in an L-shaped arrangement and are formed at a juncture portion with a common eye 34 as a fishing line engagement portion through which a fishing line (not shown) is to be inserted. The shaft 32 is formed at a distal end with an eye 36 as a fish-luring member engagement portion on which the blade 40 is carried. The blade 40 is movably connected to the eye 36 by utilizing a swivel 45. As will be understood, the swivel 45 effectively prevents twisting of the blade 40 so that the blade 40 preferably and smoothly fluctuates in the water. On the other hand, the shaft 33 is formed at a distal end with an eye 37 as a fishhook engagement portion on which the fishhook 58 and the skirt 50 are carried.

Each of the shafts 32 and 33 is made of a wire of a shape memory alloy which may exhibit superelasticity and shape recovery capability at a specific temperature range reflecting temperatures of water in which the lure 30 is used. Thus, the shafts 32 and 33 have improved resistance to deformation. Further, the shafts 32 and 33, even if bent or deformed in the water, are immediately restored to its original shape. Moreover, the shape memory alloy is less subject to deterioration with time and has higher corrosion resistance (higher resistance to rusting). Therefore, the shafts 32 and 33 cannot be easily rusted if the water is the seawater. This may extend the working life of the lure 30.

In addition, either or both of the shafts 32 and 33 may be a hybrid shaft made of the shape memory alloy and a conventional metal. Like the first embodiment, in such a hybrid shaft, the shape memory alloy should be used in a portion to which bending force is possibly applied in use, for example, a portion adjacent to the eye 34.

Referring to FIG. 3 again, the blade 40 is a leaf-shaped or oval-shaped plate and has a curved convex mid surface which is preferably treated to effectively reflect light. The mid surface of the blade 40 is formed with a mesh-like pattern. Also, the blade 40 encases a sound generator (not shown) which may generate sound when the blade 40 is rotated or swung.

The blade 40 thus constructed may rotate around the axis of the swivel 45 when the lure 30 is pulled (or leftwardly moved in FIG. 1) in the water. This is because the resistance of the water acts on the curved surface of the blade 40. Additionally, the curved surface of the blade 40 may glitteringly reflect light to lure fishes.

The skirt 50 is constituted of a holder 51 formed to imitate a small fish or a worm, and a tuft 52 of strings made of rubber or synthetic resin and fixed to the holder 51. As will be apparent from FIG. 3, the holder 51 engages the eye 37 to carry the skirt 50 thereon.

Further, the fishhook 58 is coupled to the holder 51 of the skirt 50 in such a way that it is substantially covered by the tuft 52 except for the tip thereof.

The operation of the lure 30 thus constructed will now be described.

The lure 30 is operated in the same manner as the lure 10 in the first embodiment. If the fishing line is pulled when the lure 30 is caught in obstructions, the shafts 32 and 33 are bent depending on the direction in which the fishing line is pulled.

However, when the lure 30 is removed from the obstructions, the shafts 32 and 33 are immediately and completely restored to the original shape because of its elasticity. Therefore, the lure 30 can be instantly used again without any additional work after it is removed from the obstructions.

As described hereinbefore, the shafts 32 and 33 are made of the shape memory alloy which may exhibit superelasticity and shape recovery capability at the specific temperature range. Thus, the shaft 12 exhibits resistance to deformation and, if bent, is immediately restored to the original shape. Therefore, the shafts 32 and 33 do not remain in the deformed condition provided that the water is in the specific temperature range.

Moreover, the shafts 32 and 33 are combined in an L-shaped arrangement. Thus, the shafts 32 and 33 easily flex in the directions as indicated by arrows in FIG. 4. Therefore, when the fishing line is operated such that the lure 30 is pulled at constant speed in the water, the shafts 32 and 33 gently flexes so that the blade 40 and the skirt 50 preferably behaves to effectively lure fishes and that the sound produced by the sound generator preferably changes in tone and intensity thereof.

A third embodiment of the present invention modified from the first and second embodiments will now be described with reference to FIG. 5, wherein constructions and operation identical with or similar to those of the first and second embodiments will not be explained.

Figure 5:
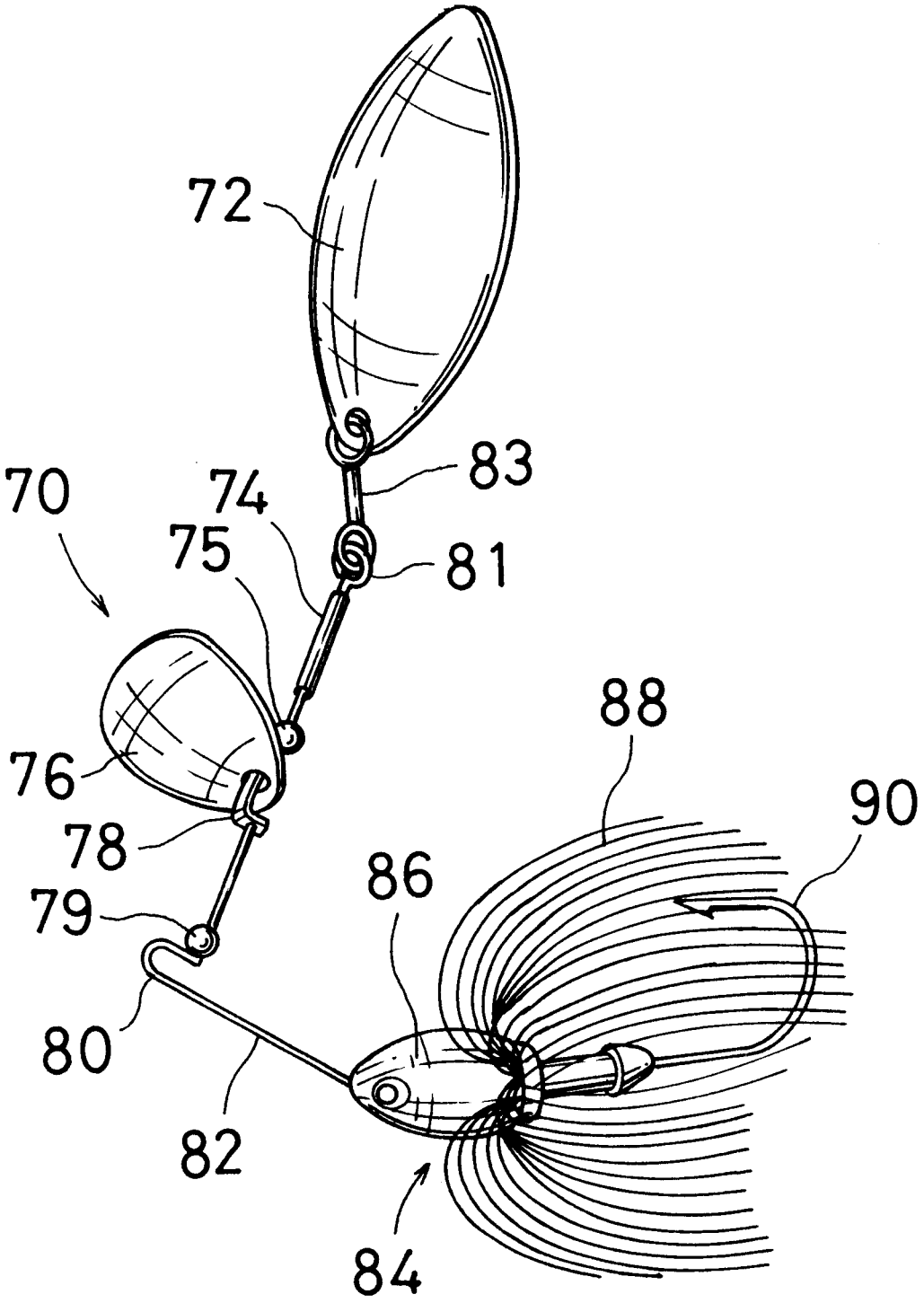
FIG. 5 is a perspective view of a lure according to a third embodiment of the present invention.

As shown in FIG. 5, a lure 70 is mainly constituted of an L-shaped shaft 82 as a connector member, a blade 72 and a supplemental blade 76 as a fish-luring member, a skirt 84 and a fishhook 90. The shaft 82 has a U-shaped bent portion 80 as a fishing line engagement portion to which a fishing line (not shown) is to be attached. The shaft 82 is formed at one end with an eye 81 as a fish-luring member engagement portion on which the blade 72 is carried. Further, the shaft 82 is formed at the other end with an eye (not shown) as a fishhook engagement portion on which the fishhook 90 and the skirt 84 are carried.

The blade 72 is movably connected to the eye 81 by utilizing a swivel 83. Also, the supplemental blade 76 is movably mounted on a desired section of the shaft 82 by a clevis 78. The shaft 82 is provided with a pair of balls 75 and 79 positioned at both sides of the clevis 78. The balls 75 and 79 are slidably mounted on the shaft 82 so as to act as a smoother for smoothly moving the supplemental blade 76. The skirt 84 is constituted of a holder 86 and a tuft 88 of strings. The fishhook 90 is coupled to the holder 86 of the skirt 84. Further, a sleeve-like body 74 corresponding to the body 26 in the first embodiment is mounted on the shaft 82, though not essential.

The present invention is not limited to the embodiments described above. Therefore, it is important to note that the embodiments can be suitably modified, if necessary. For example, the embodiment can be modified as follows:

(1) In the lure 30 of the second embodiment, one of the shafts 32 and 33 can be made of the shape memory alloy. For example, the shafts 32 and 33 can be made of the shape memory alloy and a conventional metal, respectively. As will be appreciated, it is preferable that the conventional metal is of a type having high rigidity.

(2) In the lures 10 and 30 of the first and second embodiments, each of the shafts 12, 32 and 33 has a rectilinear configuration. However, such a shaft may have an arcuate configuration or other configurations.

(3) In the lure 30 of the second embodiment, the shafts 32 and 33 are combined in the L-shaped arrangement. However, the shafts 32 and 33 can be preferably modified and combined in various kinds of arrangements, if required. For example, the shafts 32 and 33 can be combined in a T-shaped arrangement, a J-shaped arrangement, a U-shaped arrangement or a W-shaped arrangement.

(4) In the above-described embodiments, the shape memory alloy is suitably formulated to exhibit superelasticity and shape recovery capability at the specific temperature range. However, the shape memory alloy can be formulated to exhibit superelasticity and shape recovery capability under various temperature ranges, that is, under the temperature ranges greater or lower than the specific temperature range. In such cases, the shafts 12, 32, 33 and 82 do not have resistance to deformation in the water. As a result, the shafts 12, 32, 33 and 82 may relatively easily bend or deform in the water. If the shaft is bent, it is restored by heating or cooling.

(5) In the above-described embodiments, each of the blades 20, 40, 72 and 76 is of a leaf-shaped single piece type. However, the blade may be of a multiple piece type, for example, a propeller-shaped type.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A lure comprising: a connector member having a first engagement portion for a fishing line and a second engagement portion for a fish hook; a fish-luring member provided adjacent to said first engagement portion of the connector member, said connector member having a portion made of a shape memory alloy which exhibits superelasticity and shape recovery when subjected to deformation.

2. The lure as defined in claim 1 wherein said shape memory alloy comprises a wire made of an alloy which exhibits the superelasticity and shape recovery at a specific temperature range reflecting temperatures of water in which the lure is used.

3. The lure as defined in claim 1 wherein said connector member includes a shaft having said first fishing line engagement portion, and said portion made of a shape memory alloy is the portion which is adjacent to said first engagement portion.

4. The lure as defined in claim 1 wherein said connector member is a shaft having a bent portion acting as the first fishing line engagement portion, and said portion made of a shape memory alloy is positioned adjacent to said first engagement portion.

5. The lure as defined in claim 4 wherein said shaft further includes a fish-luring member engagement portion on which a first fish-luring member is carried, and a fishhook which is carried on the second engagement portion.

6. The lure as defined in claim 5 further including a second fish-luring member carried on said shaft.

7. A lure comprising a connector shaft which includes a fishing line engagement portion, and a fish-luring member freely movably provided on said connector shaft, said connector shaft having a portion made of a shape memory alloy which exhibits superelasticity, so as to increase resistance to deformation and restorability thereof.

8. The lure as defined in claim 7 wherein said shape memory alloy comprises an alloy which exhibits the superelasticity at a specific temperature range reflecting temperatures of water in which the lure is used.

9. The lure as defined in claim 7 wherein said connector shaft includes a shaft having said fishing line engagement portion, and wherein said portion made of a shape memory alloy is positioned adjacent to said fishing line engagement portion.

10. The lure as defined in claim 7 wherein said connector shaft is a shaft having a bent portion acting as the fishing line engagement portion, and wherein said portion made of a shape memory alloy is positioned adjacent to said fishing line engagement portion.

11. The lure as defined in claim 10 wherein said shaft has a fish-luring member engagement portion on which a first fish-luring member is freely movably carried, and a fishhook engagement portion on which a fishhook is carried.

12. The lure as defined in claim 11 further including a second fish-luring member freely movably carried on said shaft between the bent portion and the fish-luring member engagement portion.

* * * * *